June 8, 1926.  J. A. GROSVENOR  1,587,642
PUMP
Filed Jan. 11, 1926
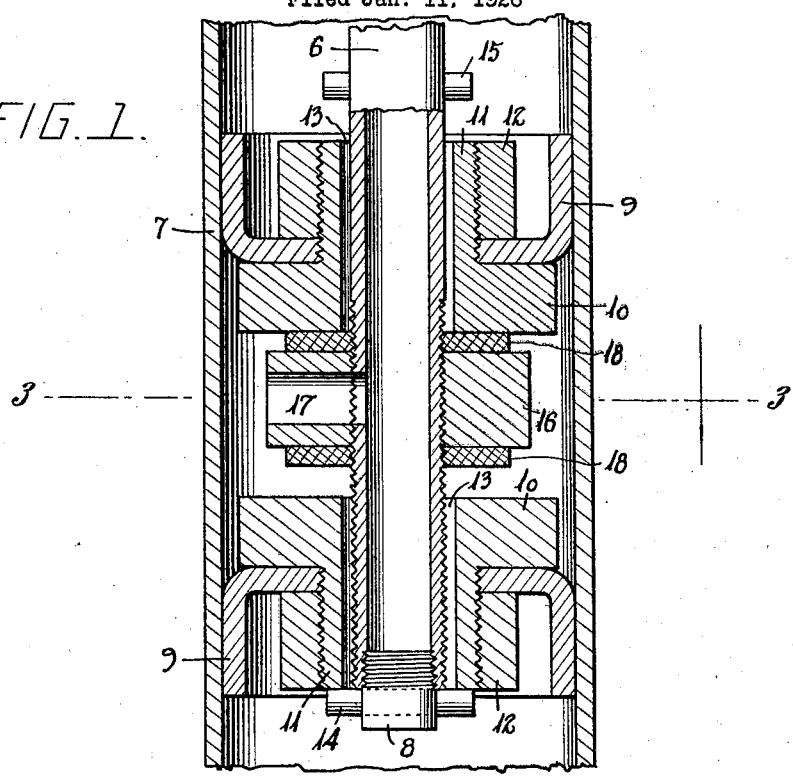
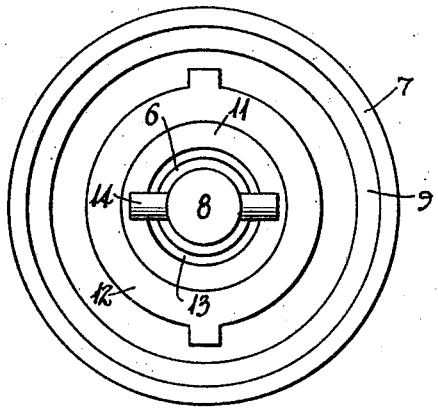
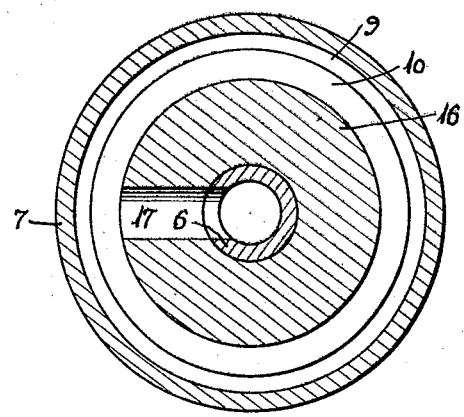
Inventor:
J. A. Grosvenor
By Monroe E. Miller
Attorney.

Patented June 8, 1926.

1,587,642

UNITED STATES PATENT OFFICE.

JOHN A. GROSVENOR, OF NORTON, KANSAS, ASSIGNOR TO C. G. PAGE, OF NORTON, KANSAS.

PUMP.

Application filed January 11, 1926. Serial No. 80,629.

The present invention relates to pumps and more especially to valved pistons therefor, and aims to provide a novel and improved valved piston construction.

Another object of the invention is the provision of a novel and improved piston head for controlling the flow of air or other fluid between a tubular or hollow piston rod or stem and the interior of the pump cylinder.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a median axial section of the improved piston.

Fig. 2 is a lower end view thereof.

Fig. 3 is a cross section on the line 3—3 of Fig. 1.

The piston rod or stem 6 is tubular or hollow and reciprocates within the cylinder 7 of the air or other fluid pump, and the inner end of the rod 6 is closed in any suitable manner, such as by a plug 8 screw-threaded or otherwise secured therein.

Leather or other flexible packing cups 9 forming parts of the piston head have their rims extending in opposite directions away from one another and bearing against the cylinder 7. The inner edge portion of each packing cup 9 is clamped between the outturned flange 10 of a sleeve or hub 11 and a clamping ring or collar 12 screw-threaded or otherwise secured on the sleeve 11. The flanges 10 of the two packing cups are disposed at those ends of the sleeves 11 nearest to one another and provide check valves. The openings 13 of the sleeves 11 are of larger diameter than the piston rod 6 so as to provide annular spaces or passages between said sleeves and rod through which the fluid may flow. The sleeves 11 are mounted loosely on the piston rod to have longitudinal movement with reference to the rod, and the movement of the sleeves away from one another is limited by any suitable means. Thus, a pin 14 extends through the plug 8 to limit the downward movement of the lower sleeve 11, as shown, and a pin or lugs 15 are secured to the rod 6 to limit the upward movement of the upper sleeve 11 with reference to the rod 6. Although the device is described with the axis vertical, it is of course apparent that the device may be used in any position.

A collar 16 is secured on the piston rod 6 between the sleeves 11, such as by screw-threading the collar on the rod, and a port 17 extends radially through the collar 16 and rod 7 to communicate with the passage of the rod 6 for the flow of air or fluid into the cylinder 7. The collar 16 is of smaller diameter than the internal diameter of the cylinder 7 so as to be spaced from the wall of the cylinder, and leather or other suitable gaskets 18 are cemented or otherwise secured to the upper and lower sides or surfaces of the collar 16 for the contact of the flanges or valve portions 10.

As shown, the piston is double-acting. Suppose the device to be used as an air pump, similar to the air pump disclosed in my Patent No. 1,509,595, granted September 23, 1924, with the air entering through the piston rod, the sleeve 11 carrying the packing cups will control the flow of air into the cylinder above and below the piston head. Thus, when the piston rod 6 is moved upwardly, as shown by the arrow in Fig. 1, the air in the upper portion of the cylinder is raised and compressed or ejected by the upper packing cup 9, and the air pressure will move the upper packing cup and sleeve 11 downwardly on the rod 6, thereby seating the flange or valve portion 10 of the upper sleeve 11 against the upper gasket 18. This will close the opening 13 of the upper sleeve 11. The friction of the lower packing cup 9 against the wall of the cylinder 7 will move the lower sleeve 11 downwardly on the rod 6, thereby removing the lower sleeve 11 from the lower gasket 18, and permitting air to enter the lower chamber of the cylinder below the piston head. The air flows in through the passage of the piston rod 6, and thence through the port or aperture 17 and opening 13 of the lower sleeve 11 into the chamber below the piston. When the piston is moved downwardly, the rod 6 and sleeves 11 are moved relatively to one another thereby seating the lower gasket 18 against the flange or valve portion 10 of the lower sleeve 11, to close the opening 13 of the lower sleeve, and the collar 16 and upper sleeve 11 are separated, so that air may enter through the port 17 and opening 13 of the upper sleeve 11 into the upper chamber of the cylinder above the piston, while the air below the piston is compressed or ejected by the downward movement of the piston. The movements of the sleeves 11 away from the collar 16 and valve seats 18 are limited by the stop pins or lugs 14 and 15, and it will be apparent that the sleeves 11 alternately seat against the gaskets or seats 18 when the piston rod 6 is reciprocated. This provided for a double acting pump, such as disclosed in said patent supra.

When a single acting pump is desired one of the sleeves 11 and its packing cup 9 are eliminated. For example, when the lower chamber of the cylinder is used, the upper sleeve 11 and upper packing cup 9 are eliminated. Then, when the piston rod is moved downwardly the air is compressed in the lower portion of the cylinder, and when the piston rod is raised air may enter through the piston rod and port 17 into the cylinder below the piston.

Having thus described the invention, what is claimed as new is:—

1. In a pump, a piston rod having a passage, a collar on the rod, and a sleeve mounted loosely on the rod for the flow of fluid between the rod and sleeve and having a portion thereon to engage a cylinder, one end portion of the sleeve being seatable against said collar to close the opening of the sleeve when the rod is moved in one direction relatively to the cylinder and said sleeve and collar being separable when the rod is moved in the opposite direction relatively to the cylinder, said passage having a port to open into the cylinder beyond said end portion of the sleeve, and the opening of said sleeve, when the sleeve and collar are separated, establishing communication between said port and the cylinder chamber beyond the opposite end of the sleeve.

2. In a pump, a piston rod having a passage, a collar on the rod having a port communicating with said passage and a valve seat at one side, a sleeve mounted loosely on the rod for the flow of fluid between the rod and sleeve and having a valve portion at one end to bear against said seat to close the opening of the sleeve when the rod is moved in one direction relatively to the cylinder and said sleeve and collar being separable when the rod is moved in the opposite direction relatively to the cylinder, and packing means mounted on said sleeve to engage the cylinder, the opening of the sleeve, when the sleeve and collar are separated, establishing communication between said port and the cylinder chamber beyond the opposite end of the sleeve.

3. In a pump, a cylinder, a piston rod in said cylinder and having a passage, a collar on the rod, a sleeve having a portion thereon engaging the cylinder and having an opening through which the rod extends with a clearance between the rod and sleeve for the flow of fluid through said opening, one end portion of the sleeve being seatable against said collar to close said opening when the rod is moved in one direction relatively to the cylinder and said sleeve and collar being separable when the rod is moved in the opposite direction relatively to the cylinder, and a stop on the rod to limit the movement of the sleeve away from said collar, said passage having a port opening into the cylinder beyond said end portion of the sleeve, and the opening of the sleeve, when the sleeve and collar are separated, establishing communication between said port and the cylinder chamber beyond the opposite end of the sleeve.

4. In a pump, a piston rod having a passage, a collar on the rod having opposite valve seats and a port between said seats communicating with said passage, and sleeves mounted loosely on the rod and having packing means to work within a cylinder, said collar being located between said sleeves for the alternate seating thereagainst of said sleeves to close the openings of the sleeves.

5. In a pump, a piston rod having a passage, sleeves mounted loosely on the rod, a collar on the rod between said sleeves and having opposite valve seats and a port communicating with said passage and located between said seats, the adjacent ends of said sleeves having valve portions to bear against said seats, and packing means on the sleeves to work within a cylinder.

6. In a pump, a piston rod having a passage, two sleeves mounted loosely on the rod and having flanges at their adjacent ends, a collar on the rod between said sleeves and having opposite valve seats and a port between said seats communicating with said passage, said flanges being seatable against said seats to close the openings of the sleeves, packing cups on said sleeves having their rims extending away from one another, and rings engaged on said sleeves for clamping said packing cups between the rings and flanges.

7. In a pump, a piston rod having a passage, opposite valve seats on said rod, said passage having a port between said seats, and sleeves mounted loosely on the rod for the flow of fluid therethrough and having means to engage a cylinder, said sleeves being located at opposite sides of said seats to seat alternately against them.

In testimony whereof I hereunto affix my signature.

JOHN A. GROSVENOR.